Dec. 19, 1939.  H. A. CENTERVALL  2,183,541
FLUID PRESSURE POWER SYSTEM
Filed Feb. 13, 1936   2 Sheets-Sheet 1
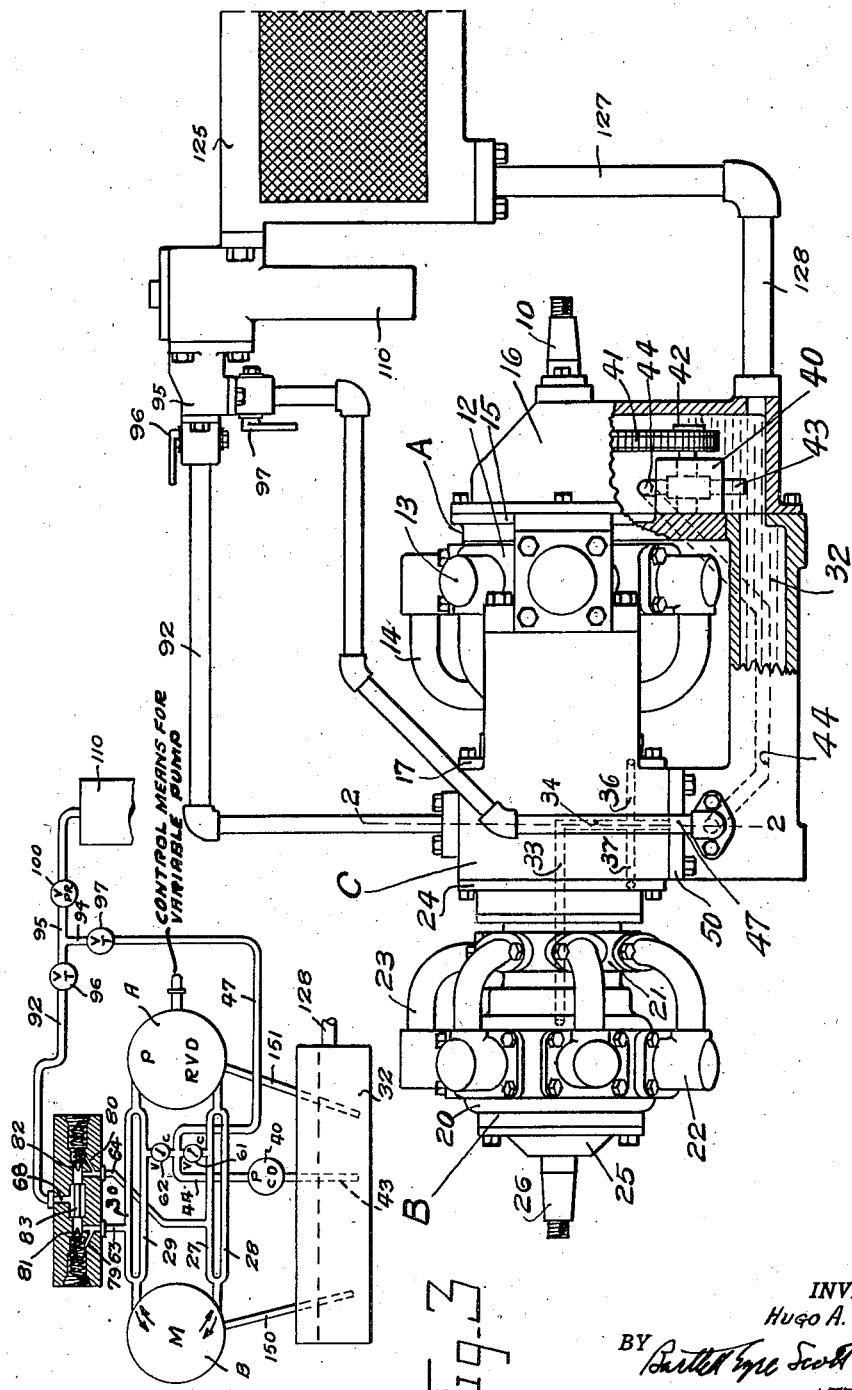
INVENTOR
Hugo A. Centervall
BY
ATTORNEYS

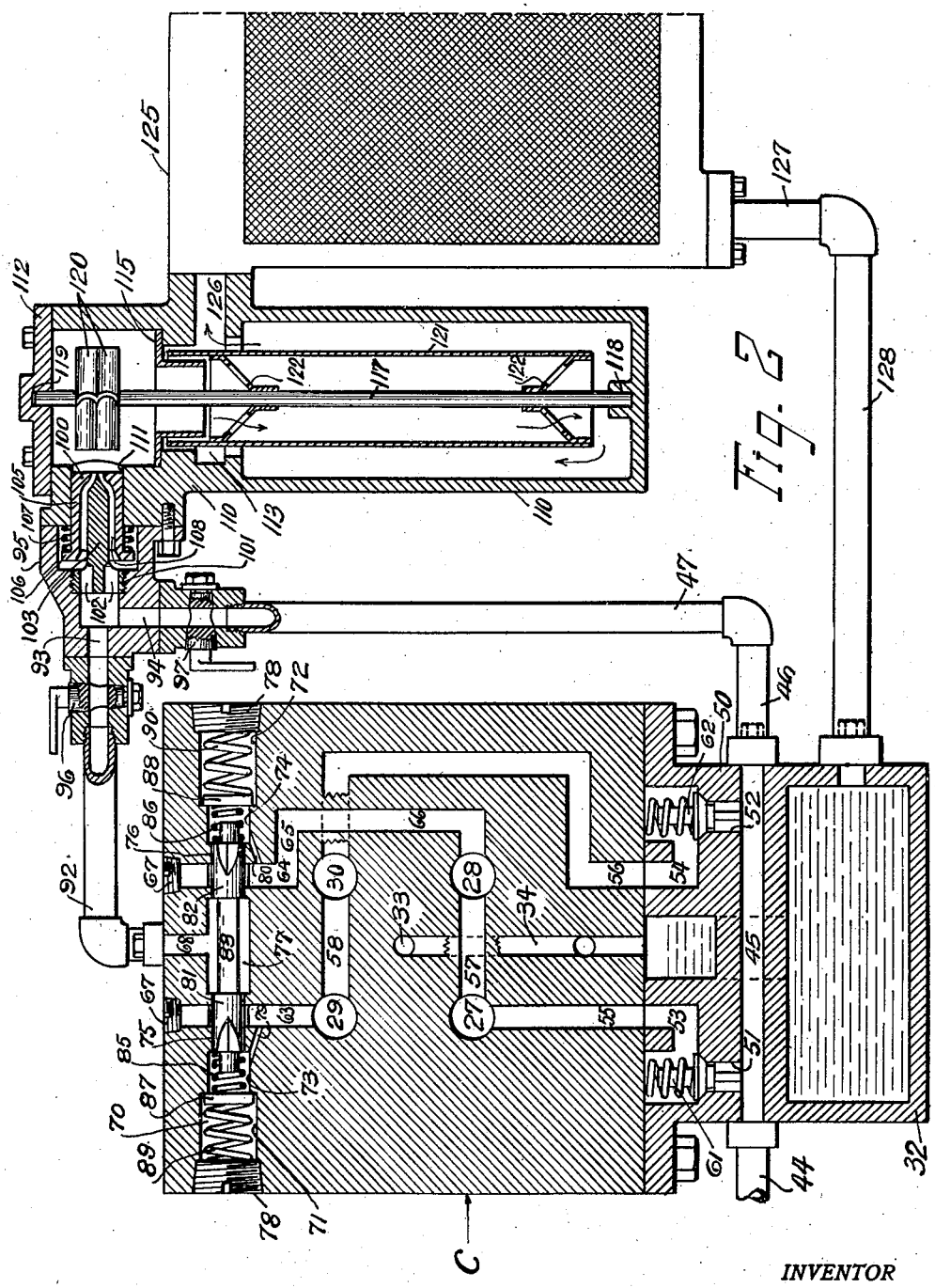

Patented Dec. 19, 1939

2,183,541

UNITED STATES PATENT OFFICE 2,183,541

FLUID PRESSURE POWER SYSTEM

Hugo A. Centervall, Brooklyn, N. Y., assignor to Manly Corporation, New York, N. Y., a corporation of Delaware Application February 13, 1936, Serial No. 63,712

20 Claims. (Cl. 60—53)

This invention relates to fluid power systems and some of its features are particularly suited for use with the type of fluid power system in which a closed fluid circuit is employed. Fluid circuits of this type are frequently used in hydraulic variable speed transmissions, and for purposes of illustration I have accordingly shown the present invention as applied in connection with a fluid device of this character.

Proper and efficient operation of a hydraulic transmission requires that its closed circuit be kept completely filled with fluid at all times and that the temperature of the working fluid be held within certain ranges to prevent overheating. Experience has also shown that devices of this character operate most satisfactorily when back pressure is maintained in the low pressure or return portion of the main fluid circuit.

It is also of the greatest importance that the fluid used in a machine of this class be free from dirt, grit and other foreign matter as these will cause cutting or binding of the parts which are necessarily closely fitted. Even careful straining of the fluid does not remove all very fine particles, and other foreign matter, such as dirt, small particles of metal, etc., will frequently be added to the circulating fluid while the machine is operated. It is therefore advantageous to employ some means for effectively and continuously cleaning the fluid to prevent injury to the machine and to secure best operating results.

An object of the invention is to provide improved means for replacing the fluid which leaks out of the main fluid circuit so that said circuit is kept completely filled and for maintaining a predetermined pressure of the fluid in the low pressure portion of the main fluid circuit. Another object of the invention is to provide means for continuously changing the fluid contained in the otherwise closed main fluid circuit and for overcoming the tendency to overheat. A further object of the invention is to provide means for cleaning the working fluid which is employed. Other and more specific objects will appear from the following description of an illustrative embodiment of the present invention.

In the drawings:

Fig. 1 is a side elevation, partly in section and partly schematic, showing the present invention as applied in connection with an hydraulic variable speed transmission.

Fig. 2 is an enlarged view, partly in section along the line 2—2 to Fig. 1, and partly schematic, showing the arrangement of parts and certain details of construction, and Fig. 3 shows in diagrammatic arrangement the invention as embodied in Figs. 1 and 2.

Referring now to the drawings, the present invention is here shown as applied in connection with an hydraulic variable speed transmission and for purposes of illustration I have chosen to employ the hydraulic transmission shown in my Patent No. 2,086,535, issued July 13, 1937. It will be understood, however, that the invention may be used with any other type of hydraulic variable speed transmission or other suitable hydraulic apparatus.

As shown in Fig. 1 of the accompanying drawings the hydraulic transmission comprises a variable stroke pump A having fluid connections with an hydraulic motor B, the adjacent ends of said pump and motor being supported by and having fluid connections through an intermediate supporting member C.

The pump A comprises a hollow rotor 12 upon which are carried a plurality of outwardly-discharging radial cylinders 13 having fluid connections through curbed hollow arms 14 with ports in a reduced hub portion, not shown, of the rotor 12, said ports being adapted to register successively with intake and exhaust ports in a stationary trunnion-like valve member, not shown. Each cylinder is fitted with the usual piston and connecting rod assembly and the inner ends of the connecting rods bear against a laterally adjustable crank mechanism by which their stroke may be varied from zero to maximum in either direction; the pistons, connecting rods and crank mechanism are not shown in the accompanying drawings. Movement of the crank mechanism, in order to alter the stroke of the pistons, may be effected by any suitable means. The rotor 12 is supported at one end by an appropriate supporting member 15 and on the other end is supported by the trunnion-like valve member, not shown, which is received within the reduced hub portion of the rotor 12. The valve member has an exposed flange 17 which is rigidly secured by any suitable means to the member C. The pump A is driven by the shaft 10 which is attached to the rotor 12 in any appropriate manner, and the forward end of said pump A is enclosed by a cover 16 which also forms part of the reservoir for surplus fluid.

The hydraulic motor B is generally similar to the pump A except that it is here assumed to have a fixed crank member so that its pistons have a corresponding fixed stroke; the motor B may be made a variable stroke if desired, however. It comprises a hollow rotor 20 having a reduced hub portion 21. Upon the rotor 20 are carried a plurality of outwardly-discharging cylinders 22 having fluid connections through reduced hollow arms 23 with ports in the reduced hub portion 21, said ports being adapted to register successively with the intake and exhaust ports of the trunnion-like valve member, not shown, of the motor B. One end of this valve member is received within the hub portion 21 of the rotor 20 and on its other end is formed an exposed flange 24 which is rigidly secured to the member C, upon which the entire weight of the motor B is carried. The rear or outer end of the rotor 20 is closed by a plate 25 having a shaft 26 which constitutes the driven shaft of the hydraulic motor B.

Formed within the member C is a pair of longitudinal passages 27 and 28 (Fig. 2) which connect with similar passages leading from one of the ports of the trunnion-like valve member, not shown, of the pump A and which also connect with similar passages leading to one of the ports of the trunnion-like valve member, not shown, of the motor B. Also formed within the member C is a pair of longitudinal passages 29 and 30 respectively (Fig. 2) which connect with similar passages leading from the other of the ports of the valve member, not shown, of the pump A and which likewise connect with similar passages leading to the other of the ports of the valve member, not shown, of the motor B. It will be readily understood that these passages form part of the closed fluid circuit between the pump A and the motor B. It will also be understood that when the device is in operation pressure fluid will pass from the pump A to the motor B either through the pair of passages 27 and 28 or the pair of passages 29 and 30, depending upon the position of the crank mechanism, and that fluid will be returned from the motor B to the pump A through the other pair of passages. In other words, whenever high pressure fluid is passing through the pair of passages 27 and 28, fluid exhausted by the motor B will be returned to the pump A through the pair of passages 29 and 30 and vice versa. For convenience the portion of the main fluid circuit containing fluid at the higher or working pressure is termed "high pressure" portion of the main circuit and the portion through which the exhausted fluid is returned from the motor to the pump is for convenience termed the "return" or "low pressure" portion of said circuit.

As will be readily understood the hydraulic transmission hereinbefore described is of the infinitely variable and reversible type. In other words, the stroke of the pump A may be made any desired amount from minimum to maximum which will produce a corresponding speed of the motor B. Also the crank mechanism of the pump A may be shifted so that the pressure fluid from the pump A is discharged into its valve port which is connected with the pair of passages 27 and 28, causing the motor B to revolve in one direction; or the crank mechanism of said pump A may be shifted so as to cause pressure fluid to be discharged into its valve port connected with the pair of passages 29 and 30 causing the motor B to revolve in the opposite direction of rotation.

In any device of this class there will necessarily be some leakage of the fluid out of the main circuit and means are provided for collecting such leakage fluid and for returning it to the reservoir. As shown in Fig. 1 the reservoir 32 is appropriately supported on the member C and extends to and is connected with the interior of the cover member 16 of the pump A which forms a portion of the reservoir for surplus fluid as hereinbefore stated. In the hydraulic transmission here chosen for purposes of illustration the fluid leaking out of the cylinders of the pump A is collected in the casing of the rotor 12, whence it passes into the interior of the cover 16 through suitable openings, not shown, in the supporting member 15. Similarly, fluid leaking out of the open ends of the cylinders of the motor B is collected in the interior of the rotor 20, whence it passes out through an appropriate passage formed in the trunnion-like valve member of said motor B, as indicated in Fig. 1 by the dotted lines 33, which is connected with the reservoir 32 by the leakage return passage 34 in the member C. Fluid leaking from the running joint formed by the trunnion-like valve member of the pump A and the valve chamber formed by the hub of the rotor 12 may pass into the interior of said rotor 12 and thence into the interior of the cover 16 and the reservoir 32 as hereinbefore explained; there are also provided however means for collecting any fluid leaking out of said running joint and passing toward the member C, which includes an appropriate channel, not shown, suitably connected with the leakage return passage 34 as by means of a passage 36 indicated by dotted lines in Fig. 1. Fluid leaking out through the running joint formed by the valve member of the motor B and the hub portion 21 of the rotor 20 may pass either into the interior of said rotor 20, and thence to the reservoir 32, or may pass toward the member C and into an appropriate channel, not shown, which is suitably connected with the leakage return passage 34 as by the passage 37 indicated by dotted lines in Fig. 1. It will be evident that all fluid leaking out of the main circuit of the hydraulic transmission is thus collected and returned to the reservoir 32.

There is also provided a small auxiliary pressure pump 40, which for convenience I term a "leakage pump". As shown in Fig. 1, the leakage pump 40 is positioned in the lower end of the cover 16 and is suitably supported as by the member 15. The leakage pump 40 is driven by some suitable means such as a chain 41 trained about a sprocket 42 of said leakage pump 40 and about a sprocket, not shown, mounted on the driving shaft 10 of the pump A. The arrangement is such that the leakage pump 40 is continuously driven whenever the pump A is in operation, thus assuring a substantially continuous delivery of pressure fluid by the leakage pump. The leakage pump 40 may be of any preferred type, such as the well known gear pump, and is preferably made of a capacity large enough to supply an excess of fluid over and above the amount needed to replenish the leakage from the main circuit. The suction side of the leakage pump 40 is connected through an intake pipe 43 with a supply of fluid in the reservoir 32 and the cover 16 and the discharge side of said leakage pump 40 is connected with a pipe 44 whose other end is connected with a transverse passage 45 formed in a distributing casing 50, here shown (see Fig. 2) as positioned beneath the member C and above the reservoir 32.

The distributing casing 50 is formed with vertical passages 51 and 52 (Fig. 2) respectively whose inner ends connect with the transverse passage 45. The passage 51 is provided with an horizontal extension which connects with another vertical passage 53 adapted to register with a vertical passage 55 in the member C. The upper end of the passage 55 connects with the longitudinal passage 27 of the main fluid circuit and through a horizontal passage 57 is also connected with the longitudinal passage 28. Similarly, the passage 52 is connected with the longitudinal passages 29 and 30 of the main fluid circuit through the passages 54, 56 and 58. Within the passages 51 and 52 are check valves 61 and 62 respectively which are adapted to open to admit fluid from the passage 45 into passages 53 and 54 respectively whenever the pressure in the corresponding passage is less than the pressure in said passage 45 but which close when the higher pressure exists in said corresponding passages 53 or 54. It will be understood that the check valves 61 and 62 act independently of each other and that either one or both of them may be held open or closed at any particular time, depending entirely upon the relative pressures in the passages 53 and 54 and in the passage 45. Also leading from the transverse passage 45 is a pipe 46 which connects with a vertical pipe 47 whose purposes will be explained later.

The member C is also provided with a vertical passage 63 which is drilled through from the top of said member C and which connects with the longitudinal passage 29 and hence also has connection with the longitudinal passage 30 through the passage 58. The member C is similarly provided with another vertical passage 64 which through the passages 65, 66 and 57 has connection with the pair of longitudinal passages 26 and 27. The upper ends of passages 63 and 64 are closed in any suitable manner as by the plugs 67.

Located near the top of member C is a transverse passage broadly designated by the numeral 70, which extends through the entire width of the said member C and intersects the vertical passages 63 and 64. The passage 70 is formed with two end portions 71 and 72 respectively of substantially equal bore and length, two reduced portions 73 and 74 respectively, also of substantially equal bore and length, two still further reduced portions 75 and 76 respectively, likewise of substantially equal bore and length, and a central counterbored portion 77 connecting the portions 75 and 76. The arrangement is such that the passages 63 and 64 connect with the reduced portions 75 and 76 respectively and the portion 73 and 74 are connected with said passages 63 and 64 respectively by the passages 79 and 80.

The reduced portions 75 and 76 are adapted to serve as valve bores for slidable valve members 81 and 82 respectively which are attached to or formed integrally with a reduced connecting link 83 of substantially the same length as the counterbore 77. The outer ends of the valves 81 and 82 are provided with stems which act as guides for springs 85 and 86 respectively adapted to act against the outer ends of said valves and against washers 87 and 88 respectively. The washers 87 and 88 are held against the shoulders (formed by the ends of the reduced portions 73 and 74 respectively) by means of heavier springs 89 and 90 respectively, the other ends of which act against suitable plugs 78 which close the ends of the passage 70. Drill holes, not shown, are provided in the washers 87 and 88 to permit the flow of fluid between the portions 71 and 73 and the portions 72 and 74 respectively. Recessed within the peripheries of the valves 81 and 82 are V-shaped longitudinal grooves which extend from the outer end of said valves to a point intermediate of their inner ends.

The member C is also provided with a passage 68 which connects with the counterbore 77 of the horizontal passage 70 and whose outer end is suitably connected, as by a pipe 92, with a passage 93 formed in a union member 95. The union member 95 is also provided with another passage 94 whose inner end connects with the passage 93 and whose outer end is connected with the pipe 47. The outer enlarged end of the passage 93 connects with a passage 111 formed in the casing 110 of the device for cleaning the fluid, to be described later.

Means are also provided for regulating the resistance to flow through the pipes 92 and 47 respectively, which in the present embodiment are shown as adjustable cocks 96 and 97 respectively, positioned intermediate the ends of said pipes and the union member 95. The cock 97 is preferably provided with a small bleed passage, not shown, or its adjustment limited to prevent its entire closure in order that there may always be a path of escape for fluid delivered by the leakage pump 40. The purpose of these cocks is to regulate the relative portions of the pressure fluid delivered by the leakage pump 40 that pass out of the distributing casing 50 through the pipes 46 and 47 and through the pipe 92 and its intervening connections.

The passages 93 and 111 are closed by an exhaust or pressure regulating valve 100 which is positioned outwardly with respect to the passage 94 and which is adapted to vary the opening so as to maintain a substantially constant predetermined pressure in the portion of the circuit intermediate said valve 100 and the leakage pump 40. The valve 100 may be of any preferred type but as here shown is of an improved type which I prefer to use in conjunction with my device for cleaning the fluid. As shown in Fig. 2, the exhaust valve 100 includes a stationary element 101 suitably fitted into an enlarged intermediate portion of the passage 93 of the union member 95 and which is provided with a plurality of passages 102 to permit fluid to pass outwardly from said passage 93. The element 101 is formed with a cylindrical portion 103 which terminates in a portion of variable diameter, here shown as pointed, and which extends into the passage 111 of the casing 110. The exhaust valve 100 also includes a hollow cylindrical movable element 105 which surrounds the stationary element 101 and which is slidably mounted in the passage 111 of the casing 110, said passage 111 being adapted to act as a valve bore for said element 105. A flange 106 is formed on the end of the element 105 which projects into the intermediate enlarged end portion of the passage 93 of the union member 95 and said flange 106 acts against one end of a spring 107 whose other end acts against the shoulder formed by the adjacent face of the casing 110. The element 105 is formed with a bore 108 which surrounds the cylindrical portion 103 of the stationary element 101. The right end, as viewed in Fig. 2, of the bore 108 is constricted in a shape substantially parallel with that of the pointed end of said element 101, which is adapted to close said bore 108 when the movable element is moved to its extreme position toward the left, as viewed in Fig. 2. The arrangement is such that fluid entering the intermediate enlarged portion of the passage 93 passes through the passages 102 into the outer enlarged portion of said passage 93, and thence out through space between the cylindrical portion 103 and the bore 108. The left end of the element 105 is thus acted upon by the fluid and is moved toward the right a distance determined by the relative pressure of the fluid and resistance offered by the spring 107. The spring 107 is preferably made such that the element 105 is moved into a position in which the constricted end of its bore 108 is closed by the pointed end of the cylindrical portion 103 whenever the fluid in the passage 93 is below a predetermined amount, and the parts of the valve 100 are preferably made such that the element 105 moves to maintain, between the constricted end of its bore 108 and the pointed end of the cylindrical portion 103, an opening substantially proportional to the volume of fluid passing therethrough, in order to maintain a substantially constant rate of flow of the fluid through said constricted end of said bore 108.

The casing 110 of my fluid cleaning device is substantially cylindrical in shape and is closed on its bottom while its upper open end is closed by a suitable cover 112. The casing 110 is provided with a three-walled annular channel 113 open on its inner side to the interior of said casing 110 and positioned below the passage 111. The upper wall of the channel 113 projects inwardly to form an annular flange which forms the support for the rim of the removable internal cover 115 whose hollow hub-like portion projects downwardly into said casing 110.

Located centrally within the casing 110 is a spindle 117 mounted for easy rotation upon a suitable support in a seat 118 in the bottom of said casing 110 and held in a substantially vertical position by another appropriate support in a seat 119 in the cover 112. To the spindle 117, at a point near its upper end and above the internal cover 115, are attached vanes 120 which are securely fastened to said spindle by any suitable means. The vanes 120 are so formed and positioned that fluid exhausted through the nozzle formed by the constricted end of the valve 100 will impinge against them and cause them to turn, thus rotating the spindle 117. For ease of assembly, the vanes 120 may be conveniently formed integrally with or attached to a hub slidably fitted on the spindle 117 and adapted to be keyed thereto in any appropriate manner.

Also located within the casing 110 is a hollow cylinder 121, here shown as open on both its ends. If desired, the lower end of the cylinder 121 may be provided with a bottom having openings, preferably near the center, of such size and shape as to readily permit the downward flow of fluid within said cylinder 121. The cylinder 121 is securely attached to the spindle 117 for simultaneous rotation therewith, as by arms 122.

Means are also provided for altering the temperature of the fluid and as here shown comprises a conventional radiator 125 having an inlet connected with a passage 126 leading from the channel 113. The radiator 125 is likewise provided with an outlet, here shown as positioned near its bottom, which is connected with the pipes 127 and 128 which lead to the interior of the reservoir 32.

The diagrammatic arrangement of Fig. 3 shows passages 150 and 151 which conduct leakage fluid from the motor B and pump A respectively to the reservoir 32. All other elements of Fig. 3 perform the same functions as those bearing corresponding reference numerals in the embodiment illustrated in Figs. 1 and 2.

The operation of the device is as follows:

When the machine stands idle, and there is consequently substantially no pressure in either of the pairs of longitudinal passages 27—28 and 29—30 or in the passage 45 of the distributing casing 50, the check valves 61 and 62 will be held closed by their springs. Likewise the valve 81, the link 83 and the valve 82 are held in their central position, as shown in Fig. 2, by the springs 85 and 86 which serve to center said valves with respect to the counterbore 77. The counterbore 77 is then cut off from communication with both of the valve bores 75 and 76 by the valves 81 and 82 respectively, and hence is also cut off from communication with the passages 63 and 64 so that no fluid may escape through them from either of the pairs of passages 27—28 or 29—30. The portions 73 and 71 of the passage 70 have a fluid connection, however, with the passage 63 through the V-shaped grooves on the valve 81; similarly the portions 74 and 72 have fluid connection with the passage 64 through the V-shaped grooves on the valve 82.

If the machine is now started with the crank mechanism in its zero stroke position, the leakage pump 40 will deliver pressure fluid through the intervening connections to the transverse passage 45 of the distributing casing 50 and will almost immediately build up pressure in it and in the connected pipes 46 and 47. As soon as the pressure in the passage 45 exceeds the pressure in either or both of the pairs of passages 27—28 or 29—30, the check valves 61 and/or 62 will open to admit pressure fluid from the passage 45 into said passages 27—28 and/or 29—30 and this will continue until the pressure in said passages equals the pressure in said passage 45. Any leakage that has occurred in either of the pairs of passages 27—28 or 29—30 and in the portions of the main circuit connected with them will thus be quickly replenished and the fluid is then brought up to the pressure determined by the setting of the exhaust valve 100. Excess fluid not needed to replace leakage will be exhausted through the pipes 46 and 47, the union member 95 and the exhaust valve 100 and will pass through the fluid cleaning device and into the radiator 125 whence it will return to the reservoir 32 to be re-circulated by the leakage pump 40.

If the crank mechanism is now moved away from its zero stroke position and adjusted so that the pair of passages 27—28 become part of the high pressure portion of the main circuit, the fluid pressure in said passages 27—28 will exceed the fluid pressure in the pair of passages 29—30, which will then be the low pressure passages conveying back to the pump A the fluid which has been exhausted by the motor B. Likewise the pressure in the passages 66, 65, 64, 74 and 72 will exceed the pressure in the corresponding passages 63, 73 and 71. The excess pressure thus exerted by the fluid upon the outer end of the valve 82 will cause said valve 82, the connecting link 83 and the valve 81 to move to the left as viewed in Fig. 2. The amount of such movement will depend upon the relative pressures in the pair of passages 27—28 and 29—30 respectively and as the pressure in the pair of passages 27—28 increases, the valve 82 and its connected members will continue to move to the left, as viewed in Fig. 2, compressing the spring 85 until the stem of the valve 81 strikes the washer 87 which acts as a stop. This movement of the valve 81 establishes communication between the passage 63 and the counterbore 77 and fluid may pass from the pair of passages 29—30 through the passage 63, the valve bore 75, the counterbore 77, the passage 68 and out through the pipe 92. The passage 64 (which is connected with the pair of passages 27—28) remains in communication with the portions 72 and 74 of the passage 70 through the V-shaped grooves on the valve 82 but said valve 82 closes the valve bore 76 and prevents the escape of any high pressure fluid from the passages 27—28 into the counterbore 77.

The parts will remain in substantially this position as long as the adjustment of the stroke of the pump A is such that the pair of passages 27—28 contain relatively high pressure fluid, until and unless the pressure in said passages 27—28 and their connected portions of the main circuit exceed the amount determined by the spring 89 when said spring 89 will be compressed and allow the valve 82 and its connected parts to be moved still farther to the left so that the inner ends of the V-shaped grooves on the valve 82 will be in communication with the counterbore 77. High pressure fluid from the passages 27—28 may then pass into the counterbore 77 and thence through the intervening passages into the passages 29—30 or out through the passage 68, the pipe 92, etc. Excess fluid pressure in the passages 27—28, and hence in the high pressure side or portion of the main fluid circuit, will thus be relieved. When the pressure in the passages 27—28 falls to the maximum determined by the spring 89, said spring 89 will move the parts to the right until the washer 87 strikes its stop formed by the outer end of the portion 73 of the passage 70.

The pressure in the pair of passages 27—28 will likewise exceed the pressure in the passage 45 of the distributing casing 50 and will close the check valve 61, thus preventing the passage of high pressure fluid from said passages 27—28 into said passage 45 and the passage of any fluid from said passage 45 into said passages 27—28. The pressure in the low pressure passages 29—30, however, would, if unaided, be substantially zero and hence less than the pressure in the passage 45, so that the check valve 62 will be opened and permit fluid from said passage 45 to pass through the passages 54 and 56 into said passages 29—30. As the passages 29—30 are thus connected with the passage 45, however, the fluid in said passages and in their connected low pressure portions of the main fluid circuit will therefore be maintained under substantially the same pressure as is determined by the exhaust valve 100.

When the crank mechanism is moved back to its zero stroke position the valve mechanism returns to the position shown in Fig. 2. When the crank mechanism is adjusted so that the pair of passages 29—30 contain the high pressure fluid delivered by the pump A, the passages 27—28 will contain the low pressure fluid which they convey back to the pump A from the motor B, and the operation of the valve mechanism is obviously reversed.

The arrangement is therefore such that whichever of the pairs of passages 27—28, 29—30, are at the time the high pressure passages are normally cut off from communication with the leakage circuit. Likewise, whichever of the pairs of passages 27—28, 29—30, are at the time the low pressure passages are automatically connected with the counterbore 77 and hence with the outlet passage 68, the pipe 92; and the corresponding check valve 61 or 62 opens to admit leakage circuit pressure fluid from the passage 45 in the distributing casing 50 into said low pressure passages. The device also limits the maximum permissible pressure in whichever of the pairs of passages 27—28 or 29—30 are at the time the high pressure passages and hence limits the maximum permissible pressure in the entire portion of the main fluid circuit which is connected with said high pressure passages, thus acting as a safety valve.

From the foregoing it will be evident that two paths of flow are thus presented to pressure fluid delivered by the leakage pump 40 into the passage 45 of the distributing casing 50, one through the pipes 46 and 47 and the other through the low pressure passages 27—28 or 29—30, as the case may be and their connected passages. The relative amounts of fluid passing out through each of these paths will depend upon and vary with the relative resistance to flow offered by each of these paths, which resistance may be regulated by the cocks 96 and 97. Thus if there is relatively little resistance to flow through the cock 96 and the connected passages intermediate said cock 96 and the passage 45, and if the cock 97 is adjusted to offer relatively great resistance, substantially all of the fluid entering the passage 45 will pass into the passage 55 or 56 (whichever is at the moment connected with the low pressure or return portion of the main fluid circuit). Assuming for purposes of illustration that this fluid passes into the passage 55, it will then pass into the passage 27 of the main fluid circuit and will force out through the passage 28, the outlet passage 68, etc., a corresponding quantity of fluid over and above the amount needed to replace whatever leakage has occurred in the main fluid circuit.

As leakage will vary with operating conditions, sometimes very little occurring, and as the leakage pump 40 is preferably made of such size that it delivers an excess of fluid over and above the quantity needed to replace leakage, there will be a substantially continuous circulation of fluid through the low pressure portion of the main fluid circuit, and heated fluid from the main fluid circuit will continuously be forced out and will be replaced by relatively cool fluid delivered from the reservoir 32 by the leakage pump 40. The heated fluid thus expelled will be cooled as it passes through the radiator 125. The amount of such exchange of cool fluid for heated fluid in the main fluid circuit may be altered as the particular installation or operating conditions require by varying the relative resistances offered, as by means of the cocks 96 and 97, and may be made practically any amount from zero to maximum. It will also be evident that leakage is positively replaced under pressure and that the low pressure portion of the main fluid circuit is maintained at a substantially constant predetermined pressure as fixed by the setting of the exhaust valve 100.

The effectiveness of the cooling thus made possible will be readily understood when it is considered that the main fluid circuit is usually of relatively small capacity as compared to the quantity of fluid delivered by the leakage pump in a short interval of time. While these will vary relative to each other with particular embodiments, in practice it will often be found that the fluid in the entire main fluid circuit will be changed and replaced by cool fluid very frequently, in some instances at a rate of several times per minute. A small drop in the temperature of fluid passing through the radiator will therefore be sufficient to dissipate considerable heat.

My improved leakage replenishing mechanism is also effective in expelling air from the main circuit. When the machine stands idle, any air in the main circuit will tend to rise to the highest point and in most instances this will be at the upper ends of the passages 63 and 64. This tendency will be increased when the machine is started and the pressure of the fluid in one or both of the pairs of passages 27—28 or 29—30 and their connected portions of the main circuit is brought up to the amount determined by the setting of the exhaust valve 100. When the crank mechanism is moved out of its zero stroke position and the exchange of fluid between the high pressure portion of the leakage circuit and the low pressure portion of the main circuit takes place as already explained, any air accumulated in the upper end of the low pressure valve port will be immediately expelled and replaced by fluid from the leakage circuit; other air in the main circuit will be similarly expelled, either alone or along with fluid from said main circuit, as the exchange continues. Non-compressible liquids, such as oils, are ordinarily used in machines of this class and best operation is secured only when the main circuit is free from all air and completely filled with liquid. The problem of expelling air from the main circuit has presented serious difficulties in the past.

Fluid, equal to the quantity not needed to replace leakage in the main circuit, will be exhausted through the valve 100 and the nozzle formed by the constricted end of the bore 108 will cause this exhausted fluid to move at an increased and relatively high speed. Such fluid will strike the vanes 120, causing them to turn and hence to rotate the spindle 117 and the attached cylinder 121. This fluid will then flow downwardly (assuming that oil or some similar fluid is used, as customary) through the hollow hub of the internal cover 115 into the rotating cylinder 121 and will in turn be set in motion and caused to rotate. Centrifugal action thus set up will throw the heavier unclean portion of the fluid, particles of foreign matter, etc., outwardly against the wall of the cylinder 121 so that dirt and other impurities will be separated from the fluid and the lighter clean fluid will pass out through the open bottom of the cylinder 121 into the interior of the casing 110. The fluid between the casing 110 and the periphery of the cylinder 121 will again be set in motion and the cleaning of the fluid by centrifugal force will thus be continued, the impurities tending to cling to the interior of the casing 110. The cleaner fluid will then be adjacent the periphery of the cylinder 121 and such fluid will overflow into the three walled annular channel 113 through the space between the lower wall of said channel 113 and the cylinder 121. Such fluid will then pass into the passage 126 and into the radiator 125, where it will be cooled and from which it will be returned through the pipes 127 and 128 to the reservoir 32. It will be observed that the lower wall of the channel 113 forms an inwardly projecting flange which acts as a safeguard against impurities passing from the cylinder 110 into said channel 113 and thence into the radiator 125 and the reservoir 32.

While any other source of power may be employed to operate the centrifugal cleaner, it will be evident that in the present embodiment said centrifugal cleaner is operated by excess fluid delivered by the leakage pump and that no extra power is required for its operation as it utilizes energy that would otherwise be wasted. As the device operates substantially continuously whenever the main pump A is being rotated, the cleaning process is likewise substantially continuous.

It is to be understood that the foregoing is merely an exemplifying disclosure and that changes may be made in the apparatus without departing from the applicant's invention as defined in the appended claims. For example, while the passages 55, 57 and 66 are here shown in the same plane, they may be positioned in separate planes and may be located at entirely different parts of the main circuit; similarly, the corresponding passages 56, 58 and 63 may be positioned at different points of the main fluid circuit if desired. It is preferred, as shown, that the inlet 55 and outlet 66 (also 56, 63) shall be disposed at different points of the main circuit for the purpose of causing the fluid from the leakage circuit to traverse a portion of the main circuit. It will also be evident that certain parts of the device may be employed separately and that their use is not limited to any particular type of fluid circulatory system.

I claim:

1. In a fluid pressure device, a main circulatory system having two portions either of which may be a high pressure portion and the other of which will then be a low pressure portion, closable means for the admission of fluid in each of said portions, closable means for the escape of fluid in each of said portions, an auxiliary circulatory system connected with each of said admission and exhaust means and means for automatically opening the admission and exhaust means connecting said auxiliary circulatory system with whichever of said portions of said main circulatory system is at that time the low pressure portion.

2. In a fluid pressure device, a main circulatory system having two portions either of which may be the high pressure portion and the other of which will then be the low pressure portion, an auxiliary circulatory system, means for admitting into said main circulatory system fluid of one relative temperature from said auxiliary circulatory system and for continuously expelling from said main circulatory system into said auxiliary circulatory system fluid of a second relative temperature and means for altering the temperature of said expelled fluid to said first named relative temperature.

3. In a fluid pressure device, a main circulatory system having two portions either of which may be the high pressure portion and the other of which will then be the low pressure portion, separate passages for the escape of fluid in each of said portions and valve mechanism controlling the escape of fluid through said exhaust passages, said valve mechanism closing both of said exhaust passages when the fluid pressure in one of said portions substantially equals the fluid pressure in the other of said portions and automatically opening the exhaust passage in whichever of said portions becomes at the time the low pressure portion whenever the fluid pressure in one of said portions substantially exceeds the fluid pressure in the other of said portions and an auxiliary circulatory system admitting fluid directly to whichever of the portions of the main circulatory system is at the time the low pressure portion.

4. In a fluid pressure device, a main circulatory system having a high pressure portion and a low pressure portion, separate passages for the escape of fluid from each of said portions and valve mechanism controlling the escape of fluid through said passages, said valve mechanism being responsive to the difference in pressure of the two portions to automatically open the passage for the low pressure portion and responsive to further increased difference between the pressures in said portions to automatically open the escape passage for the high pressure portion.

5. In a fluid pressure device, a main circulatory system having a high pressure portion and a low pressure portion, separate passages for the escape of fluid from each of said portions and valve mechanism controlling the escape of fluid through said passages, said valve mechanism being responsive to the difference in pressure of the two portions to automatically open the passage for the low pressure portion and responsive to further increased difference between the pressures in said portions to automatically open the passage for the high pressure portion, and an auxiliary circulatory system admitting fluid directly to the low pressure portion of the main circuit.

6. In a fluid pressure device, a main circulatory system having a high pressure portion and a low pressure portion, separate exhaust passages for the escape of fluid from each of said portions and valve mechanism controlling the escape of fluid through said exhaust passages, said valve mechanism being responsive to the difference in pressure of the two portions to automatically open the exhaust passage for the low pressure portion and responsive to further increased difference between the pressures in said portions to automatically oper the exhaust passage for the high pressure portion, an auxiliary circulatory system admitting fluid directly to the low pressure portion of the main circuit and means for regulating the pressure of the fluid in said exhaust passages.

7. In a fluid pressure device, a main circulatory system comprising interchangeable outgoing and return circuits, escape passages leading from said circuits, a valve mechanism responsive to close the passages when the pressure of the outgoing and return circuits are substantially the same, to open the escape passage of one circuit when that circuit has a lower pressure than the pressure of the other circuit and to open the escape passage of the other circuit when the difference between pressures in the two circuits reaches a predetermined amount, intakes leading into said circuits, an auxiliary pressure circuit and means connecting the auxiliary pressure circuit with said intakes when the pressure in the auxiliary pressure circuit exceeds the pressure in the intakes.

8. In a fluid pressure device, a main circulatory system comprising interchangeable outgoing and return circuits, exhaust passages leading from said circuits, a valve mechanism responsive to close the exhaust passages when the pressures in said circuits are substantially the same, to open the exhaust of one circuit when that circuit has a lower pressure than the pressure of the other circuit and to open the other exhaust when the pressure of the other circuit reaches a predetermined high pressure, intakes leading into said circuits, an auxiliary pressure circuit, means connecting the auxiliary pressure circuit with said intakes when the pressure in the auxiliary pressure circuit exceeds the pressure in the intake and a cleansing and cooling circuit into which said exhaust passages lead.

9. In a fluid pressure device comprising outgoing and return circuits, a source of fluid supply, means for supplying fluid from said supply under pressure directly to both of said circuits when the pressures therein are lower than a predetermined value and for supplying fluid under pressure to only one of said circuits when the relative pressures change and means for permitting the exhaust of fluid from the last named circuit while fluid is being supplied thereto from said source.

10. In a fluid pressure device, a main circulatory system having safety valve mechanism limiting the pressure therein, an auxiliary circulatory system including an auxiliary pump, two paths of flow for fluid delivered by said auxiliary pump, in addition to leakage, one of said paths including a portion of said main circulatory system, and means separate from said safety valve mechanism for regulating the relative quantities of fluid passing through each of said paths comprising fluid flow resistance regulating mechanism in at least one of said paths.

11. In a fluid pressure device, a main circulatory system having two portions either of which may be the high pressure portion and the other of which will then be the low pressure portion, separate exhaust passages for the escape of fluid in each of said portions, valve mechanism controlling the escape of fluid through each of said exhaust passages, said valve mechanism closing both of said exhaust passages when the fluid pressure in one of said portions substantially equals the fluid pressure in the other of said portions and automatically opening the exhaust passage in whichever of said portions becomes the low pressure portion whenever the fluid pressure in one of said portions exceeds the fluid pressure in the other of said portions, an auxiliary circulatory system admitting fluid directly to the low pressure portion of said main circulatory system and means for regulating the pressure of the fluid in said exhaust passages.

12. In a fluid pressure device, a main fluid circulatory system having two portions either of which may be the high pressure portion and the other of which will then be the low pressure portion, separate exhaust passages for the escape of fluid in each of said portions, valve mechanism controlling the escape of fluid through said exhaust passages, said valve mechanism closing both of said exhaust passages when the fluid pressure in one of said portions substantially equals the fluid pressure in the other of said portions and automatically opening the exhaust passage in whichever of said portions becomes the low pressure portion whenever the fluid pressure in one of said portions exceeds the fluid pressure in the other, an auxiliary fluid circulatory system including a pump, means for admitting fluid from said pump directly to whichever of said portions is at the time the low pressure portion of said main circulatory system and a path of flow for the escape of fluid delivered by said pump when said valve mechanism closes the exhaust passages in both portions of said main circulatory system.

13. In a fluid pressure device, a first fluid circuit comprising a high pressure portion and a low pressure portion, a second fluid circuit, escape means for fluid in the high pressure portion of said first circuit into said second circuit, means for exchanging fluid between the two circuits at a substantially uniform predetermined rate irrespective of the quantity of fluid escaping through the high pressure escape means of said first circuit, said exchange means including means for admitting fluid from said second circuit into said first circuit, an exhaust passage in the low pressure portion of said first circuit for the escape of fluid therefrom into said section circuit and means controlling the escape of fluid through said exhaust passage, and means for regulating the rate of fluid exchange between the two circuits.

14. In a fluid pressure device, a first fluid circuit comprising a high pressure portion and a low pressure portion, a second fluid circuit, means for exchanging fluid between the two circuits comprising a fluid admission connection for the passage of fluid from said second circuit into said first circuit, a fluid exhaust connection at a point removed from said admission connection for the passage of fluid from said low pressure portion of said first circuit into said second circuit and means controlling the passage of fluid through said exhaust connection, and means for altering the quantity of fluid admitted from said second circuit to said first circuit to alter the rate of fluid exchange between the two circuits independently of variations in leakage make-up requirements.

15. In a fluid pressure device having a closed main fluid circuit and an auxiliary fluid circuit, a system for exchanging fluid between the two circuits comprising means for continuously admitting to said main circuit fluid from said auxiliary circuit in excess of the quantity needed to replace leakage from said main circuit and continuously expelling from said main circuit into said auxiliary circuit fluid equal in quantity to said excess, and means for varying the amount of fluid admitted to said main circuit to regulate the rate of fluid exchange between the two circuits independently of variations in leakage make-up requirements.

16. In a fluid pressure device having a closed main circuit with interchangeable high and low pressure portions, and an auxiliary circuit, a system for exchanging fluid between the two circuits comprising means for continuously admitting to whichever portion of said main circuit is at the time the low pressure portion thereof fluid from said auxiliary circuit in excess of the quantity needed to replace leakage from said main circuit and continuously expelling from the same portion of said main circuit to which said fluid is admitted fluid equal in quantity to said excess, and means for varying the amount of said fluid to regulate the rate of fluid exchange between the two circuits.

17. In a fluid pressure device having a closed main circuit with interchangeable high and low pressure portions, and an auxiliary circuit, a system for exchanging fluid between the two circuits comprising means for continuously admitting to whichever of said portions of the main circuit is at the time the low pressure portion thereof fluid from said auxiliary circuit in excess of the quantity needed to replace leakage from said main circuit, and means for continuously expelling from the same portion of said main circuit to which said fluid is admitted fluid equal in quantity to said excess.

18. In a fluid pressure device, a closed main fluid pressure circuit, a fluid supply circuit leading from a source of fluid supply to the main circuit, a by-pass circuit leading from the supply circuit to said source of supply, an exhaust circuit leading from the main circuit, valve mechanism for controlling flow from the low pressure side of the main circuit through the exhaust circuit, and resistance mechanism adjustable to regulate the relative quantities of fluid passing from the supply circuit into the main circuit and the by-pass circuit respectively.

19. In a fluid pressure device, a main fluid pressure circulating circuit, a fluid supply circuit leading from a source of fluid supply to the main circuit, a by-pass circuit leading from the supply circuit to said source of supply and an exhaust circuit leading from the main circuit, including valve mechanism for both controlling the flow from the low pressure side of the main circuit through said exhaust circuit and relieving excess pressure in the high pressure side.

20. In a fluid pressure device, a closed main circuit, an auxiliary circuit including an auxiliary pump, two paths of flow for fluid delivered by said pump, one of said paths including a portion of said main circuit and the other comprising a by-pass passage, means for maintaining substantially equal predetermined pressures in both of said paths, and separate means for regulating the relative quantities of fluid passing through each of said paths comprising an adjustable fluid flow resistance mechanism in at least one path.

HUGO A. CENTERVALL.